D. T. TIMBERLAKE.
SPRING VEHICLE WHEEL.
APPLICATION FILED SEPT. 25, 1912.
1,084,303.
Patented Jan. 13, 1914.
2 SHEETS—SHEET 1.
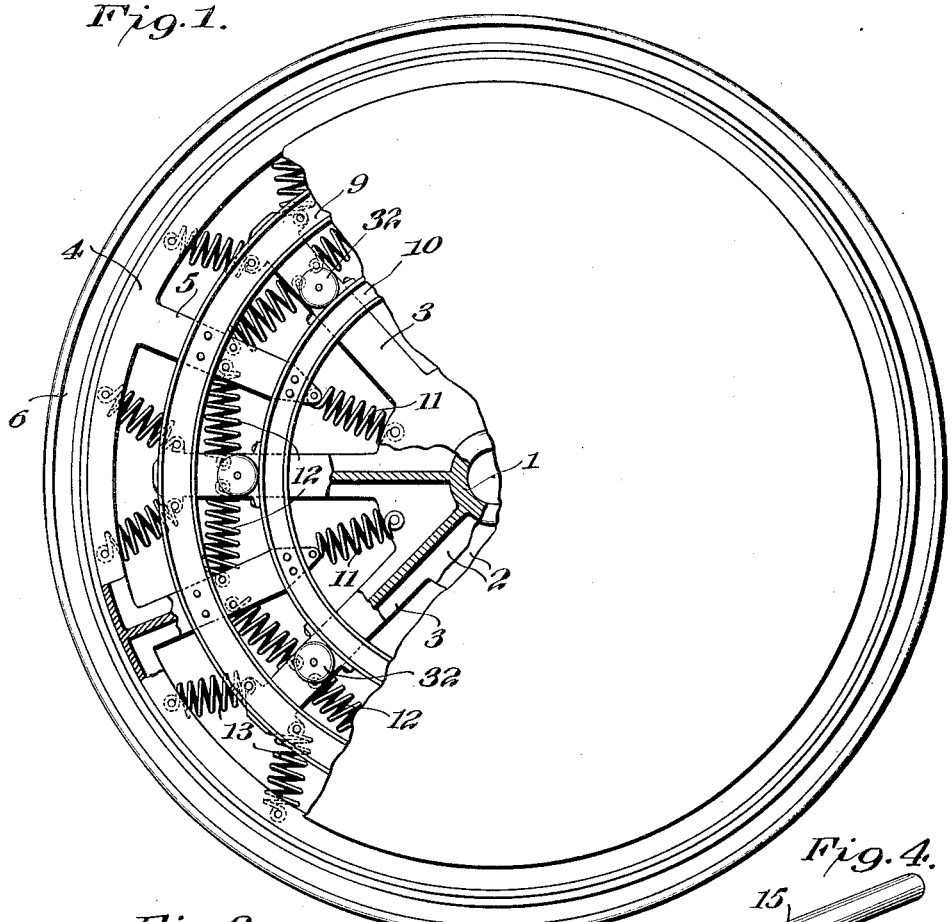
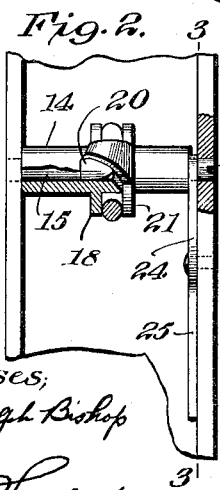
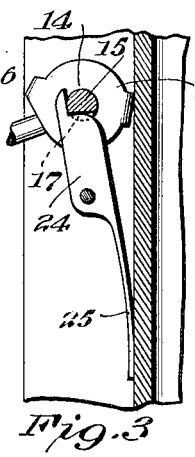
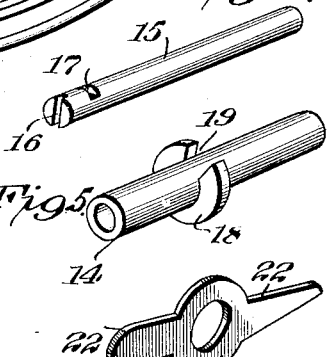
Witnesses:
J. Adolph Bishop
M. Smith
Inventor
Daniel T. Timberlake,
F. R. Cornwell.
Atty

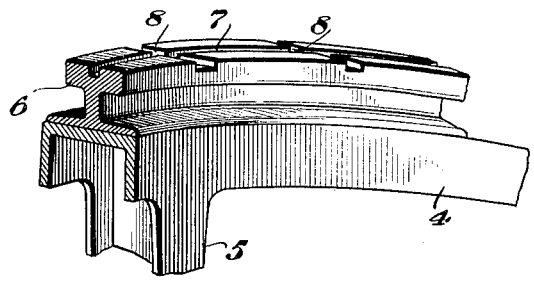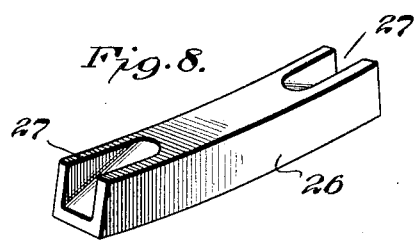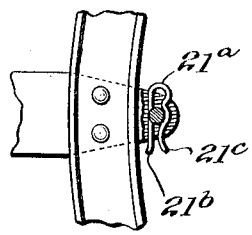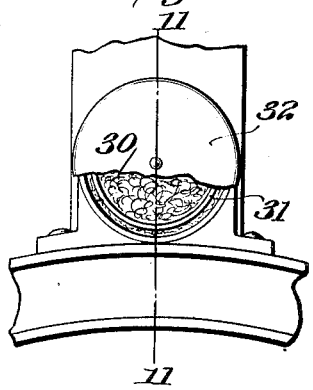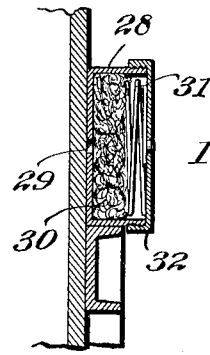

UNITED STATES PATENT OFFICE.

DANIEL T. TIMBERLAKE, OF ST. LOUIS, MISSOURI, ASSIGNOR OF ONE-HALF TO WALTER E. HOSCH, OF ST. LOUIS, MISSOURI.

SPRING VEHICLE-WHEEL.

1,084,303.

Specification of Letters Patent.

Patented Jan. 13, 1914.

Application filed September 25, 1912. Serial No. 722,261.

*To all whom it may concern:*

Be it known that I, DANIEL T. TIMBERLAKE, a citizen of the United States, residing at the city of St. Louis, State of Missouri, have invented a certain new and useful Improvement in Spring Vehicle-Wheels, of which the following is a full, clear, and exact description, such as will enable others skilled in the art to which it appertains to make and use the same, reference being had to the accompanying drawings, forming part of this specification, in which—

Figure 1 is a side elevation of a vehicle wheel of my improved construction, parts thereof being broken away in order to more clearly illustrate the construction on the interior of the wheel. Fig. 2 is an enlarged elevational view partly in section of a portion of one of the inwardly projecting arms of the wheel rim and showing the means utilized for attaching the springs to said rim. Fig. 3 is a detail section taken approximately on the line 3—3 of Fig. 2. Fig. 4 is a perspective view of one of the removable pins which carry the sleeves to which the ends of the spring are attached. Fig. 5 is a perspective view of the sleeve that is mounted on the pin. Fig. 6 is a perspective view of a washer utilized for connecting the end of the spring to the sleeve. Fig. 7 is a detail perspective view of a portion of the wheel rim and showing a metal tire thereon. Fig. 8 is a perspective view of one of a series of buffer blocks made use of in the rim of my improved wheel. Fig. 9 is a detail elevational view of a key or cotter utilized for attaching certain of the pins to which the springs of the wheel are connected. Fig. 10 is an elevational view partly in section of an oiling device made use of on my improved wheel. Fig. 11 is a vertical section taken approximately on the line 11—11 of Fig. 10.

My invention relates to spring wheels particularly intended for use upon motor vehicles and the like, my present invention being an improvement on the wheel forming the subject matter of an application for patent filed by me January 2, 1912, Serial No. 668,987.

The principal objects of my present invention are, to provide a wheel wherein the hub and spokes are formed in a single piece, preferably by casting, said hub and spokes coöperating with a rim provided with a series of integral inwardly projecting arms; to arrange resilient connections preferably in the form of coil springs between the hub and arms and the rim and spokes for the purpose of absorbing and eliminating the jar and vibration incident to the travel of the wheel upon the roadway; to provide simple means for detachably connecting the ends of the springs to the hub, spokes, rim, and arms; to arrange on the rim a metal tire which will grip the ground or roadway traversed by the wheel; to locate buffing blocks in the rim of the wheel directly opposite the ends of the spokes, and to provide simple means for applying oil to the side or bearing faces of the spokes carried by the wheel hub, which spokes operate between rings positioned on the arms carried by the wheel rim.

To the above purpose my invention consists in certain novel features of construction and arrangement of parts hereinafter more fully described and claimed.

Referring by numerals to the accompanying drawings, 1 designates a cylindrical hub with which is formed integral a pair of disks or flanges 2 spaced apart and formed integral with these disks and with said hub is a series of radially arranged spokes 3 which are preferably of I-beam shape in cross section. The rim 4 of the wheel is preferably channel-shape in cross section and formed integral therewith is a series of inwardly extending radially arranged arms 5, the same being preferably of I-beam shape in cross section.

When the two main parts of the wheel are properly assembled, the arms 5 occupy central positions between the spokes 3 as shown in Fig. 1. Applied to the rim 4 is a metal tire 6 which is substantially of I-beam shape in cross section. Formed in the outer face of this tire is a circumferential groove 7 and a series of transverse grooves 8, which latter intersect the groove 7. These grooves are adapted to engage the surface of the roadway traversed by the wheel and materially increase the tractive effect between the tire and said roadway. Fixed to the arms 5 and arranged on the side faces thereof are pairs of concentric rings 9 and 10, the same being preferably channel-shape in cross section. Arranged between the inner end of each arm 5 and the adjacent portions of the disks 2 are coil springs 11, the same being in direct alinement with said arms. Located between each spoke 3 and the adjacent arms 5 is a pair of coil springs 12, the same being arranged substantially at right angles to the spoke to which they are attached. Arranged between the outer end of each spoke 3 and the rim 4 is a pair of coil springs 13, the same being inclined or diagonally disposed with respect to the spoke to which they are attached. Each end of each of these springs is mounted upon a sleeve 14 which latter is loosely positioned upon a pin 15, the ends thereof being seated in the walls or flanges of the corresponding parts of the wheel. Each pin is provided at one end with a slot 16 adapted to receive the point of a screw-driver or like tool and formed in said pin adjacent to the end thus slotted is a notch 17 adapted to receive a latch or locking key hereinafter described. Formed integral with each sleeve 14 near its center is a disk 18 provided with a notch 19 which receives the laterally bent end 20, of a loop formed on each end of each spring, said loop encircling the sleeve 14 immediately adjacent to the disk 18. (See Fig. 2.)

To hold the loop on the end of the spring against the disk 18, I provide a washer 21 which is fitted onto the sleeve 14 immediately against the loop of the spring and formed integral with this washer is a pair of oppositely disposed ears 22, which after the washer has been properly seated, are bent so as to overlie the loop on the end of the spring and engage over the edge of the disk, thus firmly holding the loop of the spring in proper position at the center of the sleeve.

The ends of the pins 15 that are seated in the disk 2, the inner ends of the arms 5 and in the flanges of the rim 4 are locked in position within said parts by means of keys or cotter pins 21$^a$, formed of spring wire, each comprising a straight leg 21$^b$ and a curved leg 21$^c$. This key or cotter is applied to the end of the pin 15 with the central portion of the straight leg 21$^b$, positioned in the notch 17 in the pin and with the curved leg bearing against the surface of said pin opposite said notch. (See Fig. 9).

The pins carrying the sleeve on which the inner ends of the springs 13 and both ends of the springs 12 are mounted, are locked to the parts in which they are seated, by means of latches 24, each formed of a thin metal plate, the same being pivotally mounted on the corresponding part of the wheel in a manner so that its outer end normally engages in the notch 17 of the adjacent pin.

Formed integral with the rear end of each latching plate is a spring tongue 25 which normally bears against a fixed part of the wheel such as the web of the spoke 3, thereby normally holding the forward ends of the latching plate in the notch of the corresponding pin. When it is desired to remove any one of the pins for the purpose of removing a spring should the same become broken or unfit for service, it is only necessary to place the point of a screw-driver in the slot 16 in the end of the pin and partially rotate said pin, thereby moving the notch away from the end of the latching plate or away from the straight leg of the key or cotter and the pin 15 is now free to be moved lengthwise through the sleeve 14 and from the parts of the wheel in which it has been seated.

Located in the rim 4 directly opposite the end of each spoke 3 is a wooden buffer block 26 against which the outer end of the corresponding spoke engages in case the inner and outer parts of the wheel are moved to abnormal degree so that the end of the spoke contacts with the corresponding buffer block, which action may possibly occur in case the wheel goes into a rut or over an obstruction such as a stone or log.

The inner corners of each buffer block are recessed as designated by 27 in order to accommodate the springs 13 when the same are compressed as a result of the movement of one of the spokes toward the buffing block. The outer side faces of the spokes 3 bear directly against the inner faces of the rings 9 and 10 and in order to lubricate these bearing faces I locate on the ring 10 directly opposite each spoke an oil cup 28 provided in its bottom with one or more openings 29. Located in each cup is a body of fibrous material 30, such as cotton waste, impregnated with oil, the same being forced into the bottom of the cup by an expansive spring 31 carried by the screw cap or cover 32. The oil passing through the aperture 29 is delivered onto the side face of the spoke and thus the same is lubricated as it moves against the inner faces of the rings 9 and 10.

A wheel of my improved construction has great strength and resiliency, is comparatively light in weight, can be kept in repair with comparatively little expense, for the reason that all of the springs used are comparatively short and can, therefore, be cheaply manufactured, and the various springs between the two main parts of the wheel are arranged so as to absorb or eliminate all jar and vibration which would otherwise be transmitted to the load during the passage of the wheel over rough or uneven ground.

By mounting the ends of the springs upon sleeves and in turn mounting said sleeves upon removable pins seated in the main parts of the wheels it is possible to easily and quickly remove a broken spring and replace the same with a new spring.

It is the intention to arrange on the sides of my improved wheel, plates similar to the side plates shown in my prior application hereinbefore referred to.

By forming hub and spokes in one piece and the rim and inwardly projecting arms in another piece the construction of the wheel is greatly simplified and cheapened owing to the absence of expense and labor incident to the drilling of rivet-holes and the assembling of parts entering into the construction of the two main sections of the wheel. Furthermore where the integral construction is utilized, increased strength and rigidity is obtained.

It will be readily understood that minor changes in the size, form and construction of the various parts of my improved vehicle wheel may be made and substituted for those herein shown and described without departing from the spirit of my invention, the scope of which is set forth in the appended claims.

I claim:

1. In a vehicle wheel of the class described, the combination with a pair of parts which are movable with respect to each other, of pins seated in said parts, which pins are provided with notches, pivotally mounted spring latches adapted to engage in said notches to lock the pins to the parts in which they are seated, sleeves loosely mounted on the pins, and a spring the ends of which are looped around the sleeves.

2. In a vehicle wheel, a pair of parts that are movable with respect to each other, pins removably seated in said parts, said pins being provided with notches, pivotally mounted spring latches adapted to engage in said notches to lock the pins in said parts, sleeves loosely mounted on the pins, a disk on each sleeve, a spring arranged between the parts, the ends of which spring are looped around the sleeves adjacent to the disks thereon, and a washer mounted on each sleeve and engaging the looped end of the spring.

3. In a vehicle wheel, an inner part comprising an integral hub and spokes, an outer part comprising an integral rim and inwardly projecting arms, which rim is channel shape in cross section, springs interposed between said parts and buffer blocks located in the channel shaped rim opposite the ends of the spokes, the ends of which buffer blocks are cut away for the accommodation of said springs.

4. In a spring vehicle wheel, a spring bearing and support comprising a pin removably seated in a part of the wheel, which pin is provided with a notch, a spring held pawl adapted to engage in said notch to lock the pin in the part in which it is seated, a sleeve loosely mounted on the pin, a washer fixed to said sleeve, which washer is provided with a notch adapted to receive the end of the spring, and a washer loosely mounted on the sleeve and provided with a tongue, which is adapted to be bent over the end of the spring seated in the notch in the first mentioned washer.

In testimony whereof I hereunto affix my signature in the presence of two witnesses, this 14th day of September, 1912.

DANIEL T. TIMBERLAKE.

Witnesses:
M. P. SMITH,
M. A. HANDEL.